(12) United States Patent
Ahlberg et al.

(10) Patent No.: US 11,899,790 B2
(45) Date of Patent: Feb. 13, 2024

(54) CROSS-NETWORK SECURITY EVALUATION

(71) Applicant: Recorded Future, Inc., Somerville, MA (US)

(72) Inventors: Christopher Ahlberg, Watertown, MA (US); Bill Ladd, Watertown, MA (US); Sanil Chohan, Stivichall (GB); Adrian Tirados Mata, Medford, MA (US); Michael Tran, Cambridge, MA (US); Staffan Truvé, Alingsås (SE)

(73) Assignee: Recorded Future, Inc., Somerville, MA (US)

( * ) Notice: Subject to any disclaimer, the term of this patent is extended or adjusted under 35 U.S.C. 154(b) by 0 days.

(21) Appl. No.: 18/087,686

(22) Filed: Dec. 22, 2022

(65) Prior Publication Data

US 2023/0281307 A1    Sep. 7, 2023

Related U.S. Application Data

(62) Division of application No. 16/823,282, filed on Mar. 18, 2020, now Pat. No. 11,625,482.

(60) Provisional application No. 62/819,906, filed on Mar. 18, 2019.

(51) Int. Cl.
*G06F 21/56* (2013.01)
*G06F 21/55* (2013.01)

(52) U.S. Cl.
CPC .......... *G06F 21/56* (2013.01); *G06F 21/552* (2013.01); *G06F 2221/034* (2013.01)

(58) Field of Classification Search
CPC .. G06F 21/56; G06F 21/552; G06F 2221/034; H04L 63/1416; H04L 63/1425; H04L 63/1408
See application file for complete search history.

(56) References Cited

U.S. PATENT DOCUMENTS

| | | | |
|---|---|---|---|
| 8,429,748 B2 * | 4/2013 | Suit | G06F 21/566 |
| | | | 709/224 |
| 9,088,607 B2 * | 7/2015 | Jiang | H04L 63/1458 |
| 9,166,999 B1 * | 10/2015 | Kulkarni | G06F 21/31 |
| 10,230,767 B2 * | 3/2019 | Singaraju | H04L 63/1425 |
| 2016/0226905 A1 * | 8/2016 | Baikalov | H04L 63/1433 |

(Continued)

*Primary Examiner* — Ali S Abyaneh
(74) *Attorney, Agent, or Firm* — Kristofer E. Elbing (57) ABSTRACT

A computer security monitoring system and method are disclosed that feature, in one general aspect, monitoring on an ongoing basis for evidence of the presence of infected systems in one or more networks that are each associated with a monitored organizational entity possessing digital assets, continuously updating risk profiles for the entities based on information about intrusion features from the monitoring, aggregating risk scores for the entities, and electronically reporting the aggregated risk score to an end user. In another general aspect, a method is disclosed that includes acquiring and storing data relating to interactions with malware controllers over a public network, acquiring and storing a map of relationships between networks connected to the public network, extracting risk data from the stored interaction data and the stored relationship map by cross-referencing the acquired interaction data against the map of relationships, and issuing security alerts based the extracted risk data.

12 Claims, 5 Drawing Sheets

(56) References Cited

U.S. PATENT DOCUMENTS

| | | | |
|---|---|---|---|
| 2018/0004948 A1* | 1/2018 | Martin | H04L 63/1425 |
| 2019/0188616 A1* | 6/2019 | Urban | G06Q 10/0875 |
| 2020/0004957 A1* | 1/2020 | Chamaraju | G06N 20/00 |
| 2020/0177638 A1* | 6/2020 | Salman | H04L 63/205 |
| 2020/0296117 A1* | 9/2020 | Karpovsky | H04L 63/1416 |

* cited by examiner

CROSS-NETWORK SECURITY EVALUATION

CROSS-REFERENCE TO RELATED APPLICATION

This application is a divisional of U.S. application Ser. No. 16/823,282, filed Mar. 18, 2020. This patent application claims priority to U.S. Provisional Application Ser. No. 62/819,906, filed Mar. 18, 2019. This application is related to the subject matter of U.S. Provisional Application No. 62/795,493 filed Jan. 22, 2019 and the subject matter of U.S. application Ser. No. 16/749,836 filed Jan. 22, 2020. All of these applications are herein incorporated by reference.

FIELD OF THE INVENTION

This invention relates to methods and apparatus for evaluating security and/or protecting systems on large computer networks, such as the Internet.

BACKGROUND OF THE INVENTION

Corporations and other entities employ third parties, including vendors and service providers, to outsource a variety of operational tasks. There are risks associated with working with these third parties, particularly where the third party interfaces with the entity's corporate network. Security ratings providers derive and sell security ratings to assist in evaluating these third-party risks. Despite the availability of these ratings and a variety of other security tools, securing a network remains a very difficult task that is often not completely successful.

SUMMARY OF THE INVENTION

In one general aspect, the invention features a computer security monitoring method that includes monitoring on an ongoing basis for evidence of the presence of infected systems in one or more networks that are each associated with a monitored organizational entity possessing digital assets, continuously updating risk profiles for the monitored organizational entities based on information about intrusion features from the monitoring, aggregating risk scores for the monitored organizational entities, and electronically reporting the aggregated risk score to an end user.

In preferred embodiments the electronically reporting can include automatically issuing alerts to one or more related ones of a first of the monitored networks upon detection of an intrusion feature in traffic with the first of the monitored networks. The monitoring for intrusion features can include monitoring communications with one or more known or suspected malware controller machines. The aggregating risk scores can include combining information about intrusion features with information about other risks for the first of the networks. The method can further include responding to user requests to explore ontological relationships that led to the aggregated organizational risk score. The method can further include continuously gathering machine-readable facts relating to a number of topics, including evidence of the presence of infected systems, with the continuously updating further including deriving and storing risk profiles for a plurality of monitored entities based on at least some of the facts, with the method further including providing an ontology that associates a different subset of the monitored entities to each of a plurality of organizational entities possessing digital assets, with the aggregating the risk scores aggregating the risk scores for the scored entities for each of the organizational entities based on the associations in the ontology to derive an aggregated risk score, and with the electronically reporting the aggregated risk score to an end user reporting a score that is based on evidence of the presence of infected systems and other risks. The method can further include responding to user requests to explore the ontological relationships that led to the aggregated organizational risk score. The method can further include determining whether the aggregated organizational risk score meets a predetermined criteria, with the electronically reporting including electronically issuing an alert in response to the meeting of the predetermined criteria. The electronically reporting can include issuing a report that includes the aggregated organizational entity risk score. The issuing a report can include issuing a report that further includes a plurality of visual elements that visually summarize the ontological relationships that lead to the aggregated organizational entity risk score. The issuing a report can include issuing an interactive report that includes a plurality of controls that allow the user to explore the ontological relationships that lead to the aggregated organizational entity risk score. The issuing a report can include issuing an interactive report that includes a plurality of visual elements that visually summarize the ontological relationships that lead to the aggregated organizational entity risk score, with the visual elements being responsive to user actuation to allow the user to explore the ontological relationships that lead to the aggregated organizational entity risk score. The presenting visual elements can present the visual elements as a series of textual links that visually summarize the ontological relationships that lead to the aggregated organizational entity risk score, with the links being actuated to further explore the ontological relationships that lead to the aggregated organizational entity risk score. The method can further include continuously updating the ontological relationships using an ongoing ontology maintenance process. The ontological relationships can include relationships between different organizational entities. The ontological relationships can include relationships between organizational entities and their subsidiaries and contractors. The ontological relationships can include relationships between organizational entities and network identifiers. The ontological relationships can include relationships between organizational entities and types of technology. The ontological relationships can be expressed as a directed acyclic graph.

In another general aspect, the invention features a computer security monitoring method that includes acquiring and storing data relating to interactions with malware controllers over a public network, acquiring and storing a map of relationships between networks connected to the public network, extracting risk data from the stored interaction data and the stored relationship map by cross-referencing the acquired interaction data against the map of relationships, and issuing security alerts based the extracted risk data. In preferred embodiments the acquiring and storing a relationship map can acquire and a relationship map that includes partnership relationships between networks.

In a further general aspect, the invention features a computer security monitoring system that includes a network traffic monitoring interface operative to detect on an ongoing basis evidence of the presence of infected systems in one or more networks that are each associated with a monitored organizational entity possessing digital assets, risk profile generation logic responsive to the traffic monitoring interface and operative to continuously update machine-readable risk profiles for the monitored organizational entities based on information about intrusion features from the monitoring interface, aggregation logic operative to aggregate risk scores for the scored entities for each of the organizational entities, and a reporting interface operative to electronically report the aggregated risk score to an end user.

In yet another general aspect, the invention features a computer security monitoring system that includes means for monitoring on an ongoing basis for evidence of the presence of infected systems in one or more networks that are each associated with a monitored organizational entity possessing digital assets, means for continuously updating risk profiles for the monitored organizational entities based on information about intrusion features from the monitoring, means for aggregating the risk scores for the monitored organizational entities, and means for electronically reporting the aggregated risk score to an end user.

Systems according to the invention can help network administrators to detect, understand, and meaningfully assess risks posed by interacting with organizational entities. By communicating intrusion detector output that relates to third-party organizational networks, these administrators can quickly learn of changes to these risk levels and take remedial action.

DETAILED DESCRIPTION OF AN ILLUSTRATIVE EMBODIMENT

Figure 1:
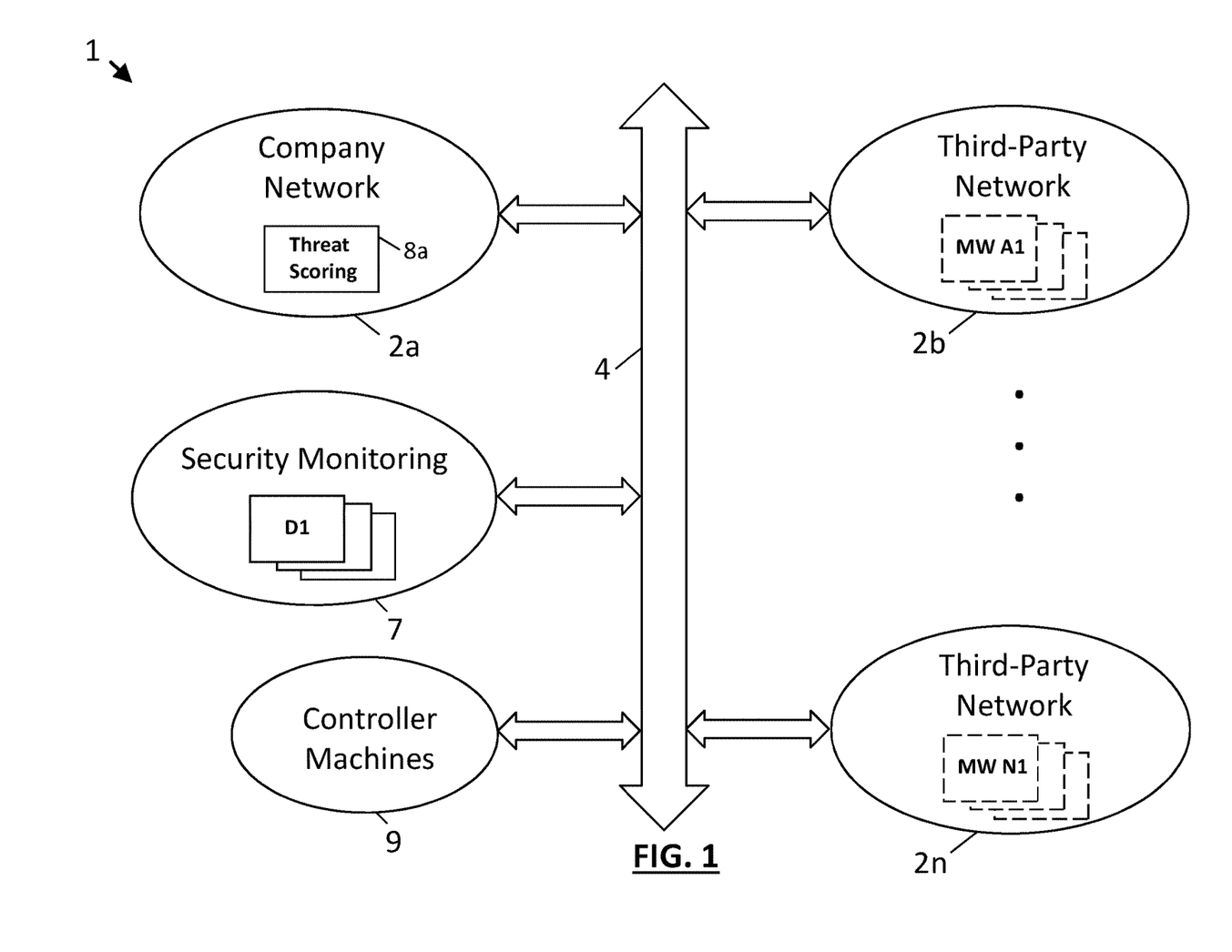
FIG. 1 is a network diagram showing an illustrative network of related organizational entities equipped with a cross-network security evaluation system according to the invention.

Referring to FIG. 1, a cross-organizational network 1 includes a number of organizational networks 2a, 2b . . . 2n that are each run by one of a number of related organizational entities. This cross-organizational network can include networks for a commercial organization and its suppliers and partners, for example, but networks of other types of entities can also be included, such as government, NGO, and non-profit entities. Generally the networks are each connected via a larger public network 4, such as the Internet. Each network can be equipped with a threat scoring system 8a to monitor threats, including risks posed by third parties or their networks.

One risk to a company is that its partners' networks 2b . . . 2n could potentially be compromised, such as through an intrusion that involves malware MWA1 . . . MWNm. This type of situation could pose an increased threat that private data entrusted to a partner could be exposed or that the intrusion could spread from a partner's network to the company network. It could also pose a broader threat to a partner's operations, which could interfere with the relationship between the company and that partner. The company's supply or distribution chains could be interrupted, for example, or its reputation could be tarnished by association.

Cyber intrusions of computer networks are typically brokered/managed by "controller" machines 9 operating across different IP addresses across the Internet. Detectors can be deployed on the larger network, such as by a security monitoring organization 7, to detect controller machines and identify IP addresses and ports used by these controller machines in traffic associated with a network. These detectors are typically specific to a specific malware family. Communication between controller machine IP addresses and legitimate infrastructure IP addresses using the identified ports can be observed, signaling an active computer infection on the legitimate network. Separately, IP addresses of legitimate organization activities can be identified.

The detectors D1, D2, . . . DN can be implemented with custom software, using software from open-source projects, or with readily available commercial products. A third-party source of updated malware detection signatures may also be provided. Other types of malware detectors that employ other detection methods could be included as well. The malware detectors can communicate their output in a structured format, such as in a table.

Figure 2:
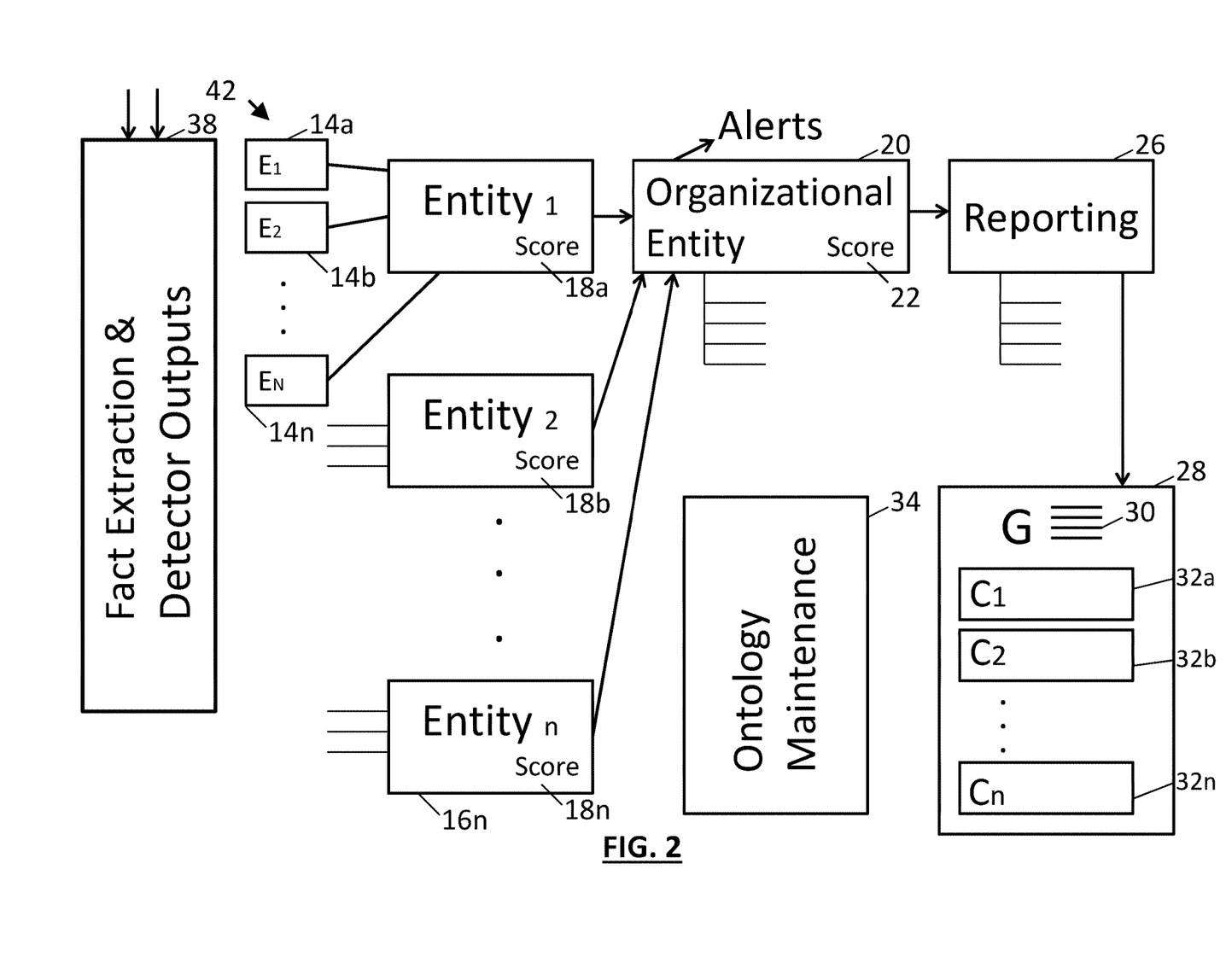
FIG. 2 is a block diagram of an illustrative organizational security scoring subsystem for use with the threat scoring system of FIG. 1.
Figure 3:
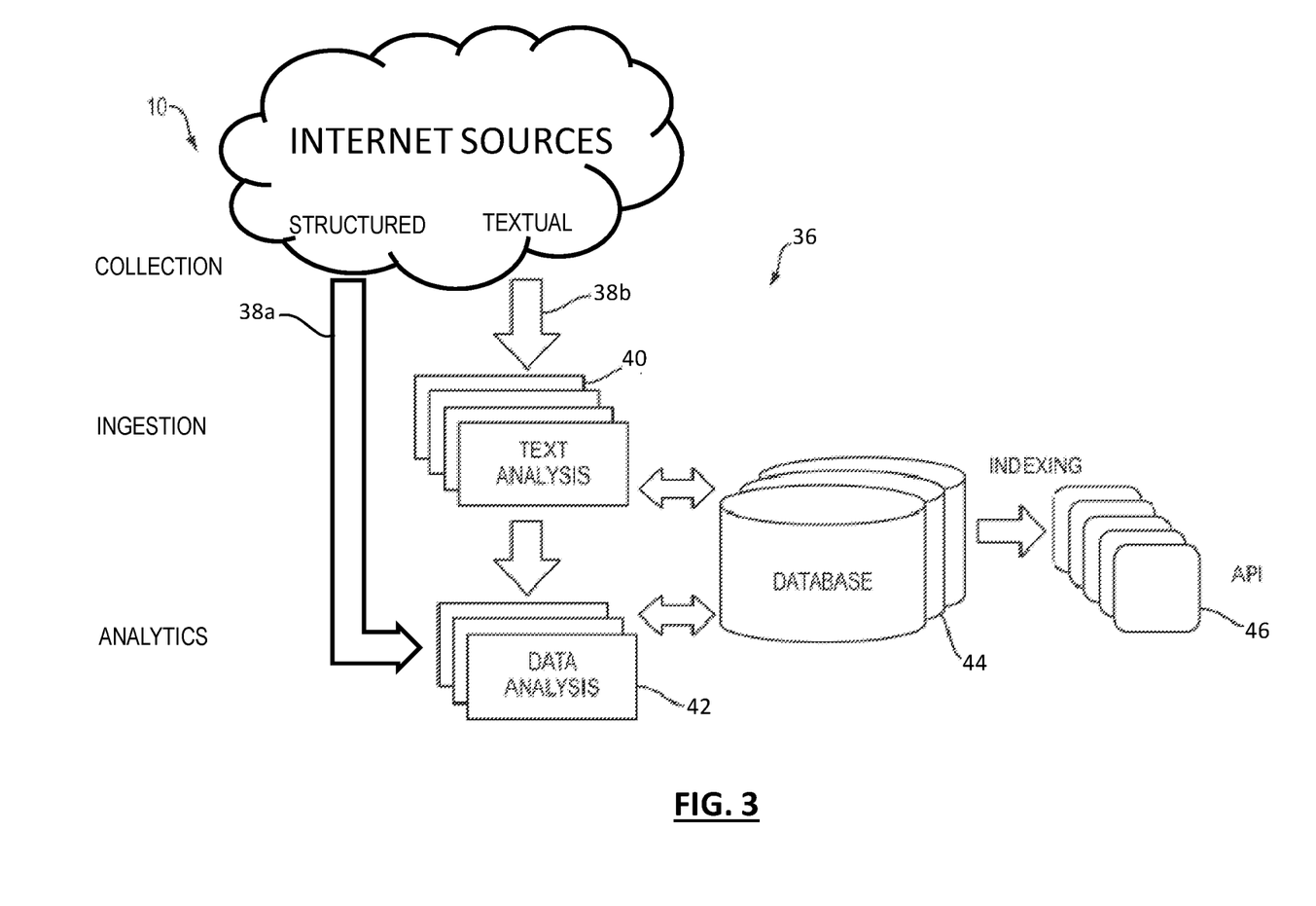
FIG. 3 is a block diagram of an illustrative threat scoring system for use with the cross-network security evaluation system of FIG. 2.

Referring also to FIGS. 2 and 3, the threat scoring system 8a can be part of a larger threat scoring system 10 that can service one or more organizations. This threat scoring system 10 can include a fact extraction subsystem 36 that collects the detector outputs and also ingests information items about a wide variety of topics from a wide variety of sources. An important source of this information is textual information posted on parts of the Internet, such as the web, but other sources, such as paid third-party information sources, can also be included. The collected information items can be continuously processed to obtain a series of facts, such by text analysis agents. The extraction process is preferably performed by the Recorded Future Temporal Analytics Engine, which is described in more detail in U.S. Pat. No. 8,468,153 entitled INFORMATION SERVICE FOR FACTS EXTRACTED FROM DIFFERING SOURCES ON A WIDE AREA NETWORK and in U.S. Publication No. 20180063170 entitled NETWORK SECURITY SCORING. These two patent documents are both herein incorporated by reference.

As shown in FIG. 2, the fact extraction subsystem 36 includes a structured data collection subsystem 38a, a textual data collection subsystem 38b, and a text analysis subsystem 40. The text analysis subsystem extracts meaning information from the collected textual information, such as by applying natural language processing techniques. This extracted meaning information and is stored with the collected intrusion detection output from the structured data collection system as a series of facts 14a, 14b, . . . 14n, such as in a database 44.

A data analysis subsystem 42 analyzes both outputs of the detectors D1, D2, . . . DN and items from the extracted meaning information to determine whether there are risks associated with them. When one or more risks are detected for a particular fact, the data analysis subsystem can associate corresponding risk identifiers with that fact. Risk identifiers can be of different types for different types of risks, and they can assigned in any suitable way. In one example, an IP address can be flagged with one type of risk identifier if it is associated with a Tor network. And a company web site that runs commonly exploited technology or older technology linked to specific exploits can be flagged with another type of risk identifier. An indexing subsystem organizes the threat information that it stores, so that it can also be accessed by one or more application programming interfaces 46 (APIs).

As shown in FIG. 2, the data analysis subsystem 42 also includes an organizational scoring subsystem 42a. This subsystem aggregates the risk identifiers from the facts and detector outputs for different monitored entities 16a, 16b, . . . 16n based on the extracted facts 14a, 14b, . . . 14n and the outputs of the detectors D1, D2, . . . DN that are relevant to that monitored entity. These aggregated risk identifiers can be stored as threat profiles that reflect the underlying pattern of risk identifiers, although they can also be stored as threat scores 18a, 18b, . . . 18n in some cases. The aggregated monitored entity threat identifiers and/or scores that are associated with an organizational entity 20 are then aggregated again to derive an organizational threat score 22.

Figure 4:
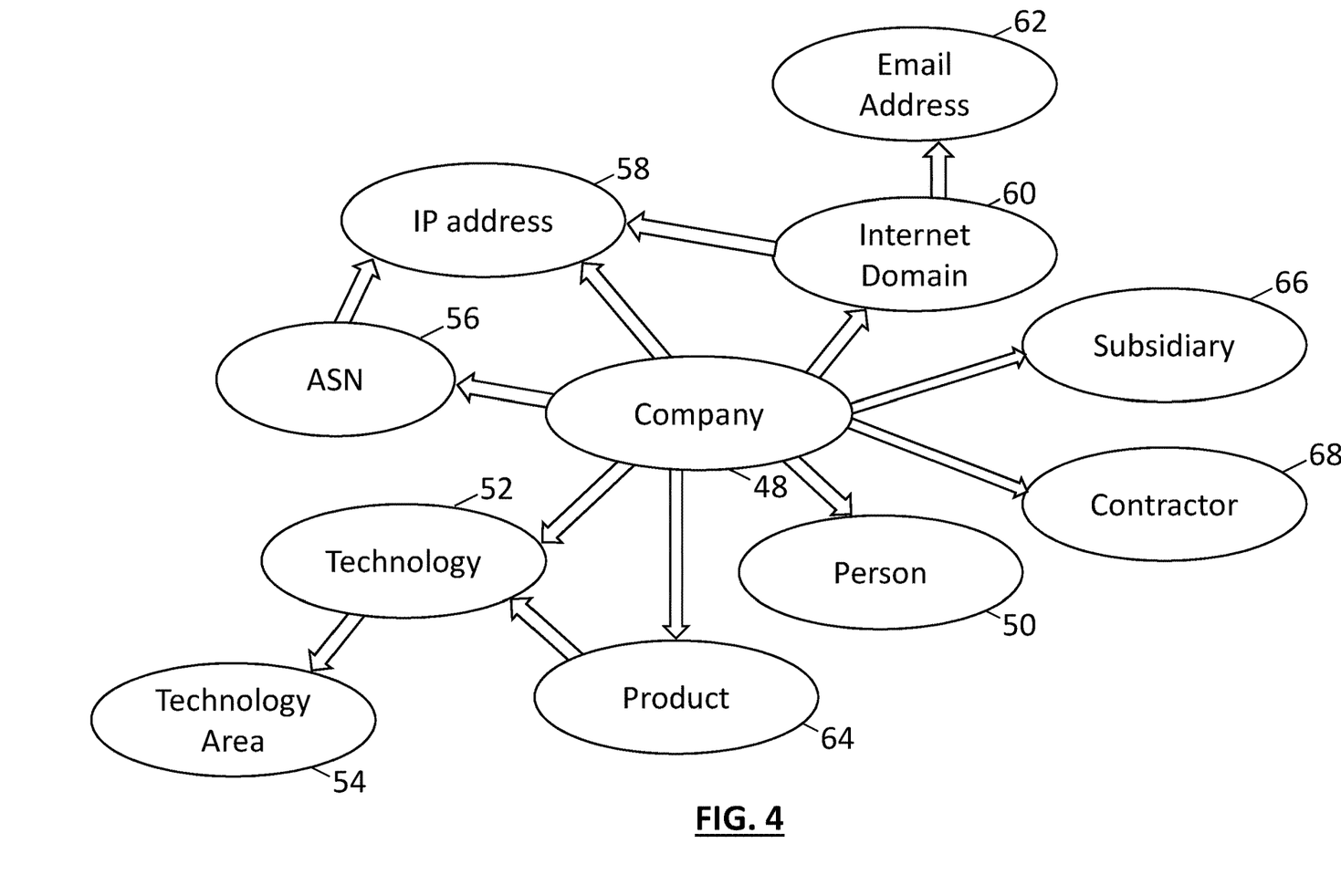
FIG. 4 is an illustrative organizational entity ontology graph for the organizational security scoring subsystem of FIG. 3.

Referring also to FIG. 4, an organizational entity 20, such as a company 48 can be associated with a variety of different types of relevant monitored entities 16a, 16b, . . . 16n, such as, for example, one or more persons 50, technologies 52, Autonomous System Numbers (ADNs) 56, IP addresses 58, Internet domains 60, email addresses 62, products 64, subsidiaries 66, and/or contractors 68. Many other types of entries can be monitored, and the list can be changed as circumstances change. The risk identifiers for the monitored entities can change as new facts are extracted, and these changes will affect the organizational entity score 20.

If the score is changed in a way that causes it to meet one or more predetermined criteria, the system can generate a real-time alert, such as by sending an e-mail message. In one embodiment, any change for the worse is reported to the user with an alert, but other suitable criteria can also be used, such as when the score reaches an absolute threshold number, or when the magnitude of a change exceeds a predetermined amount. The system can also be configured to always report when any of the detectors D1, D2, . . . DN indicate that an infection has been detected. Alerting on the detection of the active intrusion is important both to the infected organization and for third party risk for companies in business relationships with the organization hosting the infected machine.

The organizational scoring subsystem 42a can in addition include a reporting subsystem 26 that can report the aggregated score in a variety of machine-readable and user-readable formats. In one embodiment, it can present a user interface 28 with a score display area 30 and a list of ontology rule conditions 32a, 32b, . . . 32n, that led to the score. This can allow the user to quickly understand what the underlying rationale is for the score.

Figure 5:
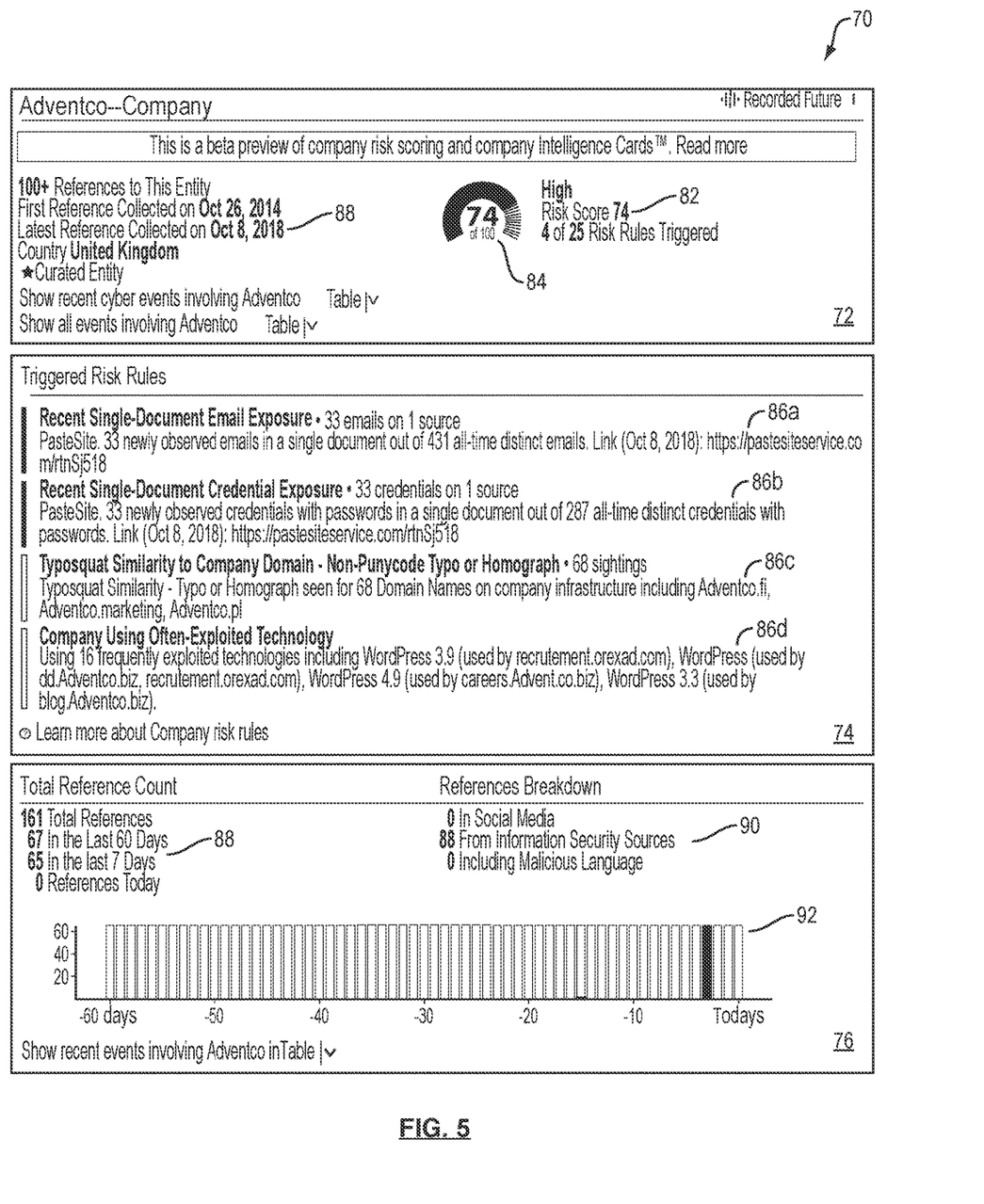
FIG. 5 is a screenshot of an illustrative interactive threat report form for a user in the cross-network security evaluation system of FIG. 1.

Referring also to FIG. 5, the reporting subsystem 26 can also present an interactive report form 70. This illustrative form presents a top-level summary box with background information 80 about the score, a risk rule count 82, and the score 84 itself to provide an easy first assessment. It also presents a triggered risk rule list box 74, and a reference box 76 that includes a reference count table 88, a references breakdown list 90, and a timeline 92, to provide more context.

This form is interactive at least in that the rule list entries 86 can be actuated to learn more about them. Each rule list entry includes a title and a list of conditions that triggered the rule, which can include a condensed list of illustrative underlying risk identifiers and/or detector outputs. This conditional list can be made up of links that allow the user to drill into pages for additional information about the condition. This additional information can include a full listing of the risk identifiers for the underlying facts and metadata for each one, such as whois and history of registration information for IP addresses. In one embodiment, the form is implemented with javascript, but it can be implemented in a variety of different ways, including any dynamic web page definition system.

In one example, rule list entries can include a high-risk entry indicating the detection of interactions with a malware controller 86a, a high-risk entry indicting the detection of exposed email 86b, a high-risk entry indicating the detection of a credential exposure 86c, and a medium-risk entry indicating the use of often-exploited technology 86d.

The interactive report form 70 can also lead a user to information about remediating the risks flagged on the form. This information can include suggestions about actions the user can take. It can also include controls that allow information about the risk to be sent to a third party organization, such as a takedown service.

The organizational scoring subsystem 42a can provide an ontology that implements any suitable relationship between the organizational entities, monitored entities, detector outputs, and facts. Organizational entities can also depend on each other, such as in a parent-subsidiary or company-contractor relationship. In one embodiment, the ontological relationships can be expressed as a directed acyclic graph.

The organizational scoring subsystem 42a can weigh the relationships within the ontology in a variety of ways. It can simply aggregate threat information, such as by using a weighted average. Or it can use a more sophisticated approach, such as a rule set that can express more complex relationships. This can allow the importance of certain types of threats to be gated based on the presence of others, for example. The relationships are specific to particular situations and technologies and it is expected that they may have to be adjusted over time in an ontology maintenance process. In one embodiment, the score is computed as follows:

$$\text{Score} = \min\left(B\min_{c_{max}} + 5 * \left(\sum_{r=1}^{r_{min}} I_{r,c_{max}} - 1\right) + \sum_{c=1}^{c_{max}-1}\sum_{r=1}^{r_c} I_{r,c}, B\max_{c_{max}}\right)$$

C is the number of risk categories, c is a specific category in (1, . . . C)

$R_c$ is the number of rules in category c, $r_{c,i}$ is a specific rule in (1, . . . $R_c$)

[$B\min_c$, $B\max_c$] is the score range for category c $$c_{max} = \max(c) \text{ where } \sum_{c_1=c+1}^{c}\sum_{r=1}^{r_c} I_{r,c} = 0$$

$I_{r,c}$=1 if rule r in category c applies to company
$I_{r,c}$=0 if rule r in category c does not apply to company The system described above has been implemented in connection with digital logic, storage, and other elements embodied in special-purpose software running on a general-purpose computer platform, but it could also be implemented in whole or in part using special-purpose hardware. And while the system can be broken into the series of modules and steps shown in the various figures for illustration purposes, one of ordinary skill in the art would recognize that it is also possible to combine them and/or split them differently to achieve a different breakdown.

The embodiments presented above can benefit from temporal and linguistic processing and risk scoring approaches outlined in U.S. Ser. No. 61/620,393, entitled INTERAC- TIVE EVENT-BASED INFORMATION SYSTEM, filed Apr. 4, 2012; U.S. Publication Nos. 20100299324 and 20090132582 both entitled INFORMATION SERVICE FOR FACTS EXTRACTED FROM DIFFERING SOURCES ON A WIDE AREA NETWORK; as well as to U.S. Ser. No. 61/550,371 entitled SEARCH ACTIVITY PREDICTION; and to U.S. Ser. No. 61/563,528 entitled AUTOMATED PREDICTIVE SCORING IN EVENT COLLECTION, which are all herein incorporated by reference.

The present invention has now been described in connection with a number of specific embodiments thereof. However, numerous modifications which are contemplated as falling within the scope of the present invention should now be apparent to those skilled in the art. While automatic cross-organizational notification of malware detection can be combined with other organizational risk scoring, for example, these functions can also be implemented independently. Therefore, it is intended that the scope of the present invention be limited only by the scope of the claims appended hereto. In addition, the order of presentation of the claims should not be construed to limit the scope of any particular term in the claims.

What is claimed is:

1. A computer security monitoring method, including:
   acquiring and storing data relating to interactions with malware controllers over a public network,
   acquiring and storing a map of relationships between networks connected to the public network,
   extracting risk data from the stored data relating to interactions with the malware controllers and the stored map of relationships by cross-referencing the acquired interaction data against the map of relationships,
   issuing security alerts based on the extracted risk data, and
   issuing reports that each include a plurality of visual elements that visually summarize the relationships and the interactions with malware controllers that lead to the issuing of security alerts, wherein the visual elements are responsive to user actuation and wherein user action of actuating of the visual elements causes the user to explore the relationships and the interactions with malware controllers that lead to the issuing of security alerts, wherein the presenting visual elements further presents the visual elements as including series of textual links that visually summarize additional information about the relationships and the interactions with malware controllers that lead to the issuing of security alerts, and wherein actuating of the textual links causes the user to explore the additional information about the relationships and the interactions with malware controllers that lead to the issuing of security alerts.

2. The method of claim 1 wherein the acquiring and storing a relationship map acquires a map of relationships that includes partnership relationships between networks.

3. The method of claim 1 wherein the issuing security alerts is based on combined information about interaction with malware controllers and information about other network risks.

4. The method of claim 1 further including continuously gathering machine-readable facts relating to a number of topics, including evidence of the presence of infected systems, wherein the issuing alerts is based on combined information about interaction with malware controllers and the gathered machine-readable facts.

5. The method of claim 1 further including responding to user requests to explore the relationships that led to the issuing of security alerts.

6. The method of claim 1 wherein the issuing reports includes issuing reports that each further include a plurality of controls that allow the user to explore the relationships that lead to the issuing of security alerts.

7. The method of claim 1 further including continuously updating the relationships using an ongoing maintenance process.

8. The method of claim 1 wherein the relationships include relationships between different organizational entities.

9. The method of claim 8 wherein the relationships include relationships between organizational entities and their subsidiaries and contractors.

10. The method of claim 1 wherein the relationships include relationships between organizational entities and network identifiers.

11. The method of claim 1 wherein the relationships include relationships between organizational entities and types of technology.

12. The method of claim 1 wherein the relationships can be expressed as a directed acyclic graph.

* * * * *